Jan. 13, 1925.  1,522,780
D. E. HENNESSY
DEVICE TO FACILITATE STRIPPING ARTICLES FROM VULCANIZING MOLDS
Filed April 28, 1922
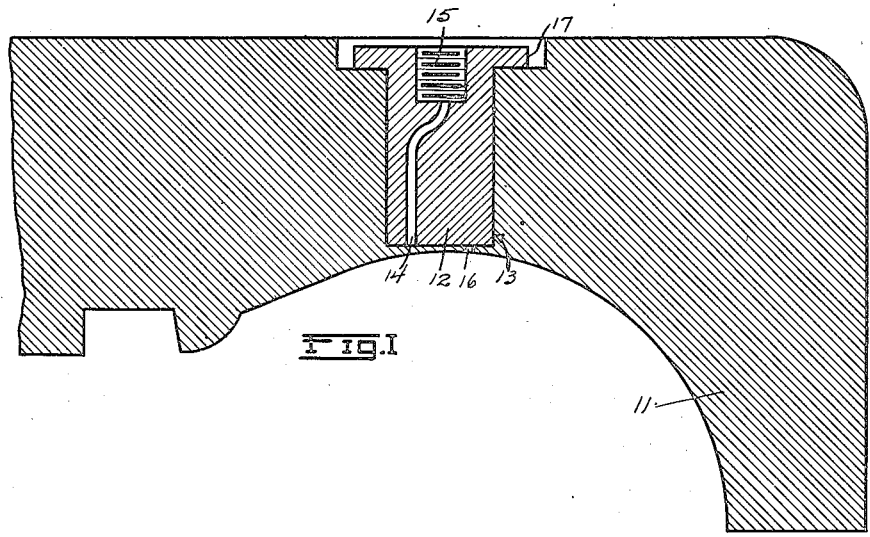
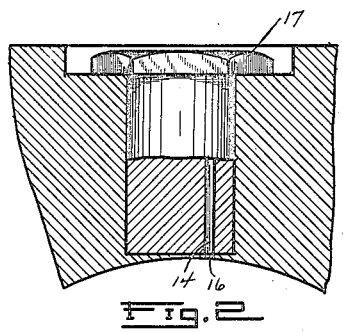
DANIEL E. HENNESSY
INVENTOR Patented Jan. 13, 1925.

1,522,780

UNITED STATES PATENT OFFICE.

DANIEL E. HENNESSY, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

DEVICE TO FACILITATE STRIPPING ARTICLES FROM VULCANIZING MOLDS.

Application filed April 28, 1922. Serial No. 557,205.

*To all whom it may concern:*

Be it known that I, DANIEL E. HENNESSY, a citizen of the United States, and a resident of Milwaukee, in the county of Milwaukee and State of Wisconsin, have invented certain new and useful Improvements in Devices to Facilitate Stripping Articles from Vulcanizing Molds, of which the following is a specification.

My invention relates to means for overcoming the difficulty experienced in stripping rubber articles from the molds in which they have been cured. In the drawings accompanying this specification and forming a part thereof I have shown, for purposes of illustration, one form which my invention may assume. In these drawings:

Figure 1 is a fragmentary section through a tire mold embodying this illustrative form of my invention, while Figure 2 is a detail showing certain of the parts in a second position.

The embodiment herein disclosed is shown as applied to a tire mold 11 and comprises a cylindrical plug 12 seated in a recess 13 in the mold 11 and provided with a duct 14 opening at the top into a screw threaded socket 15 and arranged at the bottom eccentrically of the plug 12 and such a distance from the axis of the plug 12 as to align, upon rotation of the plug 12, with a cooperating duct 16 leading from the bottom of the recess 13 to the interior of the mold 11. The plug 12 may be provided with any suitable means whereby it may be rotated, such, for example, as the hexagon head 17 herein shown.

During curing the plug is positioned as shown in Figure 1 to prevent any escape of rubber through the duct. When it is desired to remove the tire the plug is rotated to align the ducts 14 and 16 to provide communication from the exterior to the inner surface of the mold and thus permit the entrance of air into the space formed between the tire and the mold as the tire is removed to thus destroy the vacuum which normally exists in that space and materially resists the removal of the tire.

Under certain circumstances it may be desirable to do more than merely destroy the vacuum and in such cases a fluid pressure conduit may be connected to the socket 15 and fluid under pressure forced between the tire and the mold to thus positively eject the tire from the mold.

A plurality of plugs may be employed to more effectively accomplish the result desired and the plugs may vary from that herein shown. The entire disclosure herein is illustrative only and my invention is not limited thereto.

I claim:

1. In a tire mold a rotatable plug controlling by its rotation a passage from the interior to the exterior of said mold.

2. In a tire mold, a recess communicating with the interior of said mold, a rotatable plug, provided with a duct, in said recess and adapted upon rotation to open and close a passage from the interior to the exterior of said mold.

3. A tire mold as in claim 4, said duct terminating exteriorly in a socket.

4. In a tire mold, a recess communicating with the interior of said mold, a rotatable plug controlling by its rotation a passage from the interior to the exterior of said mold, and means lying below the exterior surface of said mold, to rotate said plug.

In testimony whereof I have signed my name to the above specification.

DANIEL E. HENNESSY.